Patented July 30, 1929.

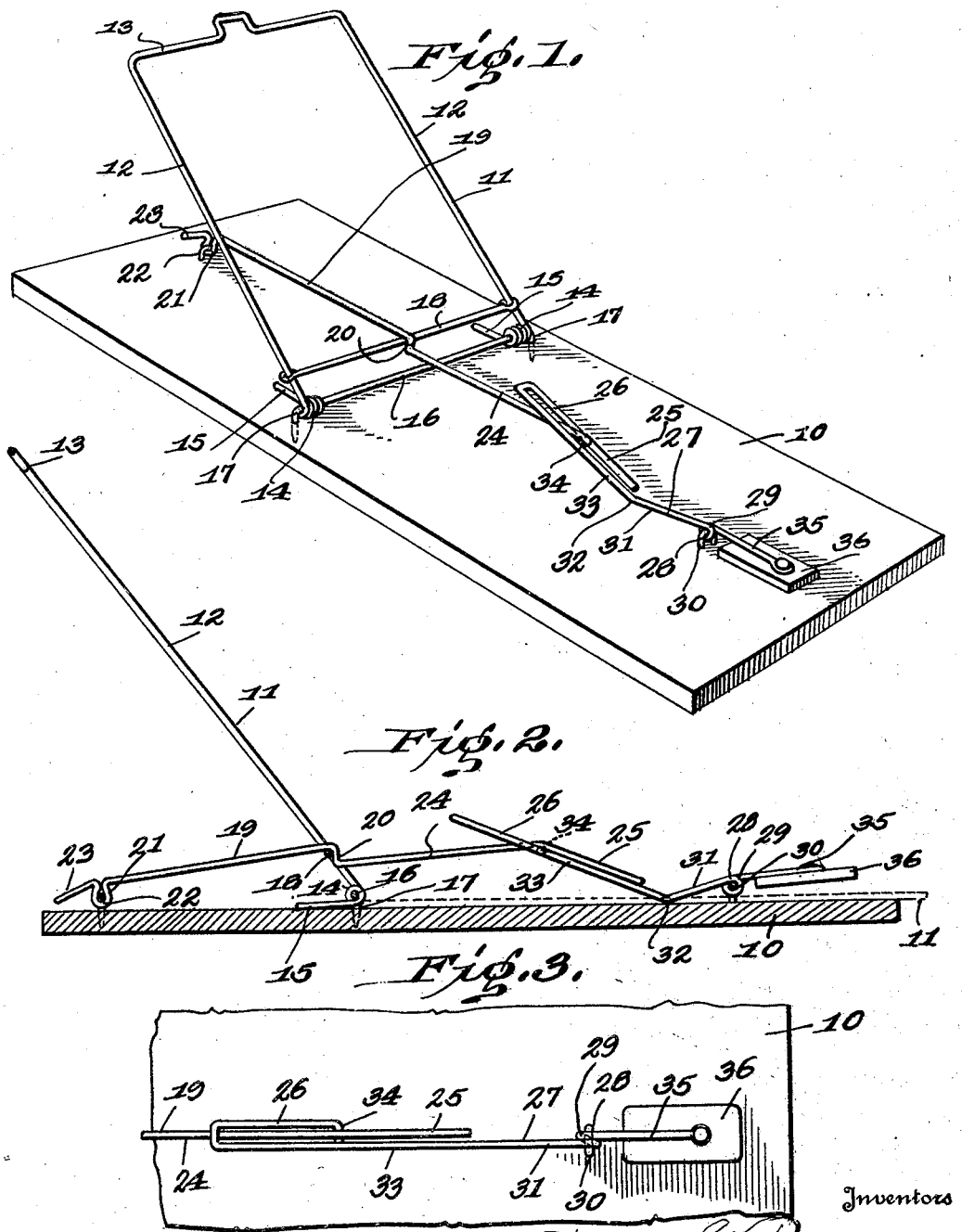

1,722,857

UNITED STATES PATENT OFFICE.

WILLIAM G. RAMSEY, EDWARD S. EICHENLAUB, AND JOHN M. BARNIVILLE, OF WILLARD, OHIO.

RODENT TRAP.

Application filed November 29, 1926. Serial No. 151,407.

Our invention relates to a rodent trap and aims to provide a novel and improved device of this character which may be conveniently set with perfect safety and will be effective in catching rodents.

Our invention contemplates the provision of a spring forced jaw held in set position by a trip lever which is adapted to be released from the jaw by a pivoted bait holder, said trip lever and bait holder being so associated that it is only necessary to force the jaw back against spring tension to reset the trap, thus eliminating the necessity of holding the bait platform in raised position during resetting of the trap, which would endanger the fingers of the user during such resetting.

It is also an object of the invention to provide a trap of the above indicated character, which is simple and substantial in construction, which can be manufactured economically, and which will be thoroughly efficient and practical in use.

With the foregoing and other objects in view, which will be apparent as the description proceeds, the invention resides in the construction and arrangement of parts, as hereinafter described and claimed, it being understood that changes can be made within the scope of what is claimed, without departing from the spirit of the invention.

The invention is illustrated in the accompanying drawings, wherein:

Figure 1 is a perspective view of our improved trap, showing the same in set position, Figure 2 is a longitudinal vertical section through the trap, showing the same in set position and showing in dotted lines the position of the jaw after the same has been released, and Figure 3 is a fragmentary top plan of the bait holder and a portion of the trip lever associated therewith.

Referring to the drawings the numeral 10 designates the base or platform, which has pivotally supported thereon slightly towards one end from the center thereof a jaw 11 consisting of a U-shaped member preferably formed of wire and having parallel side portions 12 and a bight portion 13. The ends of the side portions 12 remote from the bight portion 13 are coiled, as at 14, adjacent their ends, while the terminals 15 thereof protrude a slight distance from said coiled portions and bear on the platform. Extending through the coiled portions on each end of the U-shaped jaw is a bar 16 which has its opposite ends turned at right angles and secured into the base or platform 10, as at 17. By providing the coiled portions with the extended terminals engaging the base or platform 10 said coils not only act as a means for pivoting the jaw but also as means for yieldably forcing the jaw against the base or platform 10.

Extending between the opposite parallel side portions 12 of the jaw adjacent the points where the same are coiled is a bar 18 which has its opposite ends rigidly secured to said side portions 12 so that said bar will be carried by the jaw against movement with relation thereto. Pivoted adjacent to the end to which the jaw is pivoted is a trip lever 19, which extends across and over the bar 18 carried by the jaw 11 and is offset, as at 20, so as to provide a shoulder for engaging over said bar in order to hold the jaw 11 in set position against spring tension. The pivotal connection of the trip lever is formed by providing an eye 21 on said lever engaging a staple 22 driven into the base or platform 10. The extremity of the trip lever adjacent the eye 21 extends rearwardly and downwardly, as at 23, so as to engage the base or platform 10 upon excessive upward movement of the trip lever on its pivot so as to limit said upward movement.

The trip lever extends forwardly after the forming of the offset portion 20 thereon, as at 24, and is then slightly bent downwardly, as at 25. Adjacent the point where the trip lever is bent downwardly at 25, the same extends through an elongated loop 26 provided in one end of a bait holder 27 pivoted to the forward end of the base or platform 10, as at 28. The bait holder is arranged in the formation of a lever, constructed of relatively stiff wire which is looped, as at 29, to provide an opening through which a staple 30 extends to form the pivotal connection 28. The bait holder lever 27 is pivoted to the base or platform 10 at a point spaced from the loop 26 and has the portion 31 thereof adjacent said pivotal connection extending downwardly to a point where the same engages the base or platform 10 when the trap is set, as at 32 in Figure 2 of the drawings. From the point 32 the lever extends at an angle to the portion 31 thereof in an upward and rearward direction, as at 33, until the forming of the loop 26 thereon. The loop 26 is formed by bending the end of the wire from which the bait lever is constructed back on itself for a relatively long distance and then turning the extremity thereof towards the main portion of the lever, as at 34. Thus it can be seen that a relatively long loop is formed on one end of the bait holder lever through which the portion 24 of the trip lever extends.

The opposite end of the bait holder lever or the end opposite to the point where the same is pivoted, as at 28, extends forwardly, as at 35, and has secured thereto a bait platform 36 for receiving and supporting the bait.

By referring to Figure 2 of the drawings, it can be seen that when the trap is in set position the bait platform 36 is elevated or raised above and in close relation to the main base or platform 10, while said point 32 of the lever engages the main base or platform 10 for supporting the bait holder lever in position, and that the trip lever has the offset portion 20 thereof in engagement with the bar 18 of the jaw for holding the jaw in raised position against spring tension with the portion 24 of the trip lever extending through the elongated loop 26 in the bait holder lever.

In operation, the user of the trap may conveniently grasp the spring forced jaw with one hand and the base or platform 10 with the other and force the jaw to a raised or set position as shown in Figures 1 and 2 of the drawings. The jaw will then engage behind the offset portion 20 of the trip lever. As the trip lever is always within the loop 26 of the bait holder lever, said bait holder lever will be swung to its set position. When an animal exerts a slight downward pressure upon the bait supporting platform 36, the bait holder lever will be swung upon its pivot 28, thus raising the end thereof carrying the loop 26 which will cause the end 24 of the trip lever to also be raised. Upon the raising of the trip lever, the offset portion 20 thereof will be disengaged from the spring forced jaw, thus permitting said jaw to quickly move in a violent manner towards the forward end of the base or platform so as to catch and hold the animal. It can be seen that when the trap has been released that the portion 24 of the trip lever will always remain in the loop 26 of the bait holder lever due to the fact that the portion 25 of said trip lever extends a relatively long distance through the loop so as to prevent disengagement of the portion 24 from the loop 26. It is also to be noted that the bent portion 34 of the bait holder lever which forms a part of the loop 26 is the portion which engages the trip lever in order to swing the same on its pivot.

Having thus described our invention, what we claim as new is:

1. A trap comprising a base, a spring forced jaw mounted upon said base, a bar carried by said jaw, a trip lever pivotally mounted upon said base and having an offset portion thereon for engaging said bar in order to hold said jaw in set position, a bait holder pivotally mounted upon said base intermediate its ends, a bait platform on one end of said bait holder, and a loop formed on the opposite end of said bait holder through which said trip lever extends so as to cause movement of said trip lever upon movement of said bait holder and for resetting said bait holder upon resetting of said jaw.

2. A trap comprising a base, a U-shaped jaw having the opposite parallel side portions thereof coiled at points spaced from the free ends thereof, a bar carried by said U-shaped jaw for movement therewith, a bar secured to said base and extending through said coiled portions and pivotally supporting said U-shaped jaw in order that the extremities of said parallel side portions engage said base so that said coiled portions act as spring means for yieldably urging said U-shaped jaw in engagement with said base plate, a trip lever pivotally mounted upon said base and provided with an offset portion for engaging said bar carried by said jaw, and a bait holder pivoted upon said base and associated with said trip lever for causing movement of said trip lever to release said jaw upon movement of said bait holder.

3. A trap comprising a base, a U-shaped jaw having the opposite parallel side portions thereof coiled at points spaced from the free ends thereof, a bar secured to said base and extending through said coiled portions and pivotally supporting said U-shaped jaw in order that the extremities of said parallel side portions engage said base so that said coiled portions act as spring means for yieldably urging said U-shaped jaw in engagement with said base plate, a bar extending between the opposite side portions of said U-shaped jaw, a trip lever pivotally mounted upon said base and having an offset portion therein for engaging said bar in order to hold said jaw in set position, and a bait holder pivotally mounted upon said base and associated with said trip lever so as to cause movement of said trip lever to release said jaw upon movement of said bait holder.

WILLIAM G. RAMSEY.
EDWARD S. EICHENLAUB.
JOHN M. BARNIVILLE.